United States Patent [19]

Biggs et al.

[11] Patent Number: 4,477,523

[45] Date of Patent: * Oct. 16, 1984

[54] FLAME RETARDANT CROSSLINKED POLYOLEFIN INSULATION MATERIAL

[75] Inventors: James W. Biggs, Lebanon; Melvin F. Maringer, Cincinnati, both of Ohio

[73] Assignee: National Distillers and Chemical Corporation, New York, N.Y.

[ * ] Notice: The portion of the term of this patent subsequent to Sep. 14, 1999 has been disclaimed.

[21] Appl. No.: 536,825

[22] Filed: Sep. 28, 1983

Related U.S. Application Data

[63] Continuation of Ser. No. 371,688, Apr. 26, 1982, abandoned.

[51] Int. Cl.³ .......................... C08K 5/38; C08K 5/09; C08K 3/22; C08L 23/08

[52] U.S. Cl. .................... 428/389; 428/391; 523/212; 524/87; 524/94; 524/228; 524/229; 524/232; 524/264; 524/288; 524/300; 524/303; 524/305; 524/322; 524/563

[58] Field of Search ............... 524/87, 228, 229, 232, 524/94, 288, 300, 303, 305, 322, 264, 563; 428/389, 391

[56] References Cited

U.S. PATENT DOCUMENTS

| | | | |
|---|---|---|---|
| 3,796,775 | 3/1974 | Glaser et al. | 524/228 |
| 3,832,326 | 8/1974 | North et al. | 524/563 |
| 3,860,676 | 1/1975 | Krackeler et al. | 524/411 |
| 3,891,587 | 6/1975 | Watts | 524/232 |
| 3,900,681 | 8/1975 | Walters | 428/379 |
| 3,922,442 | 11/1975 | North et al. | 524/437 |
| 3,969,304 | 7/1976 | Pugh et al. | 524/229 |
| 4,035,325 | 7/1977 | Poppe et al. | 524/382 |
| 4,124,549 | 11/1978 | Hashiudo et al. | 524/563 |
| 4,180,490 | 12/1979 | Maclean | 524/777 |
| 4,243,579 | 1/1981 | Keogh | 524/423 |
| 4,255,303 | 3/1981 | Keogh | 524/39 |
| 4,279,805 | 7/1981 | Ohzeki et al. | 524/350 |
| 4,322,575 | 3/1982 | Skipper | 524/437 |

FOREIGN PATENT DOCUMENTS

| | | | |
|---|---|---|---|
| 0002814 | 2/1967 | Japan | 524/232 |
| 0117547 | 9/1979 | Japan | 524/228 |
| 0078048 | 6/1980 | Japan | 524/228 |

OTHER PUBLICATIONS

Derwent Abst. 22080E/12 BE890270; 22079E/12 BE890269, Published 3-8-82.
Derwent Abst. 70694Y/40 (9-77) BE852991 Nat. Distillers.
Derwent Abst. 67910C/39 (9-80) DT2909498 BASF AG.
Derwent Abst. 96744X/52 (11-76) J51128194 Sumitomo.
Derwent Abst. 68609B/38 (9-79) GB2016016 Nat. Distillers.
Derwent Abst. 52283D/29 (5-81) J56062842 Sekisui Chemi.
Derwent Abst. 14389E/08 (1-82) J57005752 Mitsubishi.
Derwent Abst. 52282D/29 (5-81) J56062841 Sekisui Chemi.

*Primary Examiner*—Herbert J. Lilling
*Attorney, Agent, or Firm*—Kenneth D. Tremain

[57] ABSTRACT

A filled crosslinked polymeric composition of ethylene-vinyl ester copolymer which has a significant degree of flame retardancy by inclusion of a dual lubricant system which includes a fatty acid and an alkylene-bis-amide.

30 Claims, No Drawings

FLAME RETARDANT CROSSLINKED POLYOLEFIN INSULATION MATERIAL

This is a continuation of co-pending application Ser. No. 371,688 filed Apr. 26, 1982, now abandoned.

BACKGROUND OF THE INVENTION

The present invention relates to cross-linkable polymeric compositions which exhibit moisture, heat and flame resistance and which are useful in producing insulated wire and cable as well as molded products. More particularly, it relates to an ethylene-vinyl acetate copolymer composition having a high degree of flame retardancy.

One of the most important areas where fire resistant polymer compositions find use is in the electrical environment, i.e., where both insulating and fire resistant properties are sought, most especially in the area of conductor insulation. At one time, extrudable compositions available to the wire and cable art were required, for flame resistance, to contain halogenated polymers such as chlorinated polyethylene, polyvinyl chloride, chlorobutadiene, chlorinated paraffin, etc., together with antimony trioxide, both components being present in sizable quantities. Alternatively, a coating of chlorosulfonated polyethylene paint was applied to a non-flame retardant insulating compound which constituted an additional manufacturing operation.

For certain types of dry transformers, particularly high voltage transformers, a problem existed in that electrical failures occurred due to surface creepage of the organic insulating compound used. The problem was solved through the addition of hydrated alumina to compositions whose organic binder consisted of butyl rubber, epoxy resins or polyester resins. However, these compositions do not possess a balance of excellent extrudability characteristics, physical and electrical properties, heat resistance and flame retardance. Such compositions are disclosed in U.S. Pat. Nos. 2,997,526; 2,997,527 and 2,997,528 to Kessel et al. The described compositions for such usage have poor tensile strength, elongation and percent elongation retained after aging.

Fire retarding polymeric compositions exhibiting, inter alia, improved moisture and heat resistance consisting essentially of an intimate mixture of at least one cross-linkable polymer containing as a major component an ethylene-vinyl acetate copolymer, one or more silanes and one or more hydrated inorganic fillers have found wide acceptance in the wire and cable art. Compositions such as these are disclosed in U.S. Pat. Nos. 3,832,326 and 3,922,442 of North et al. These patents disclose compositions which contain 80 to 400, preferably 125-140 weight parts of filler per 100 weight parts of polymer and 0.5 to 5.0 parts of silane per 100 parts of filler. No specific concentration range of lubricant is disclosed although 2 parts of calcium stearate per 100 parts of polymer are utilized in all of the fourteen compositions of the examples.

The prior art polymeric compositions of North et al., exhibit a balance of improved physical and electrical properties together with a high degree of flame and fire retardance. These highly desirable results are achieved without the use of halogenated polymers such as polyvinyl chloride and chlorosulfonated polyethylene, thereby eliminating hydrogen chloride fumes; without carbon black, thereby permitting its use as colored insulations; without any flame retardant coatings such as are currently required, thereby eliminating an additional step in manufacturing operations when the compositions are used as, e.g., insulating compounds extruded onto a conductor.

Such compositions find particular use as white (an inherent property) and colored uniinsulation compositions, which can be extruded over metal, e.g., copper or aluminum, conductors, to provide a single layer insulating and jacketing composition which is rated according to U.L. standards for 90° C. operation, and in some cases operation at temperatures as high as 125°, at up to 600 volts.

The insulating compositions of North et al. have found particular utility in the insulation of switchboard wire, appliance wire, and automotive wire where a unique combination of superior electrical properties combined with resistance to the degradative effects of heat and flame are essential, and where low smoke density and non-corrosive fumes are desirable.

North et al. contemplate ethylene-vinyl acetate copolymers in their compositions crosslinked by irradiation with high energy sources or through the use of chemical crosslinking agents. As has been observed with other radiation cured polymeric compositions, radiation cured compositions prepared in accordance with the disclosures of North et al. have poorer physical strength properties than their peroxide cured counterparts. The reasons for this are not fully understood although the precise nature and amount of the major and minor components in the composition are thought to be a contributing factor. Several modifications were made to the peroxide curable product to produce the radiation curable counterpart. The copolymer in the radiation curable product has a higher vinyl acetate content and aluminum stearate has been substituted for the calcium stearate lubricant. Although this has improved the physical strength of the radiation cured composition over what it would have been, it is still significantly lower than the peroxide cured product.

Copending U.S. Ser. No. 185,460, filed Sept. 9, 1980, now U.S. Pat. No. 4,349,605 describes a radiation crosslinked polymer composition having improved physical strength properties substantially similar to a chemically crosslinked counterpart. The improved physical strength properties are achieved by the use of increased amounts of silane and the substitution of the lubricant Mold Wiz for the aluminum stearate lubricant.

Besides the three essential components, other additives can be incorporated into the compositions of North et al. to provide certain desireable qualities. Included in these additives are pigments, antioxidants and stabilizers.

Antioxidants are included to inhibit polymer degradation resulting from oxidation which proceeds by a free radical chain mechanism. The antioxidants act either to tie up the peroxy radicals so that free radicals are incapable of propagating the reaction chain, or to decompose the hydroperoxides in such a manner that carbonyl groups and additional free radicals are not formed. The former, called chainbreaking antioxidants, free radical scavengers, or inhibitors, usually are hindered phenols, amines, and the like. The latter, called peroxide decomposers, generally are sulfur compounds (i.e., mercaptans, sulfides, disulfides, sulfoxides, sulfones, thiodipropionic acid esters and the like), or metal complexes of dithiocarbamates and dithiophosphates.

The art also shows stabilizers for synthetic resins such as in U.S. Pat. No. 4,279,805 which describes an alkylene bis-thioalkanoic acid amide as a stabilizer, and corrosion inhibitors as, for example, described in U.S. Pat. No. 4,124,549 to Hashiudo et al.

Another disclosure, U.S. Pat. No. 4,255,303 to Keogh, shows a composition for electrical applications having electrical resistance, tensile strength, and elongation capability which includes ethylene-vinyl acetate, halogenated flame-retardant, antimony trioxide, peroxide and zinc stearate. U.S. Pat. No. 4,035,325 to Poppe et al describes a combination in which the effectiveness of flame retardant combinations of antimony trioxide and a halogen-containing compounds such as hexabromocyclododecane (HBCD), chlorinated paraffins, tetrabromophthalic anhydride (TBPA), and tetrabromoterephthalic acid (TBTA), is purportedly increased by the addition of certain organometallic compounds which have the chemical structure of either substituted hydrazines or substituted 3-amino-1,2,4-triazole amides.

By the present invention there is provided a polymeric composition with a lubricant system which also significantly increases the flame-retardancy of the composition.

SUMMARY OF THE INVENTION

In accordance with the present invention, it has been found that a significant flame-retardant quality can be achieved in ethylene copolymer (particularly ethylene-vinyl acetate copolymers) compositions containing silane-treated hydrated inorganic fillers by the use of a lubricant composition comprising a fatty acid having 8 to 25 carbon atoms and an alkylene-bis-amide wherein the alkylene group has from 2 to 8 carbon atoms and the amide constituent has from 8 to 25 carbon atoms, such lubricant composition, preferably used in combination with antimony trioxide and a halogenated flame retardant additive in addition to the normally flame retardant hydrated alumina. Specifically, the present composition includes the use of the above-described lubricant composition in lieu of the normal calcium stearate lubricant normally used in the above-described combinations. More particularly, this invention is directed to a crosslinkable polymeric composition comprising:

(a) a copolymer of ethylene and a vinyl ester of a $C_2$–$C_6$ aliphatic carboxylic acid, a $C_1$–$C_6$ alkyl acrylate or $C_1$–$C_6$ alkyl methacrylate, (b) from 80 to 400 parts of hydrated inorganic filler per 100 parts of copolymer, (c) 0.4 to 8, and preferably 0.8 to 4, parts of an alkoxy silane per 100 parts of hydrated inorganic filler, and (d) an antiflame component containing a halogenated flame retardant, antimony trioxide in addition to the normally flame retardant hydrated inorganic filler, and, quite surprisingly, a dual lubricant system comprising a fatty acid having from 8 to 25 carbon atoms and an alkylene-bis-amide wherein the alkylene group contains from 2 to 8 carbon atoms and the amide groups contain from 8 to 25 carbon atoms.

The present invention can also be described as being concerned with an improvement in a cross-linkable polymeric composition of the type containing (a) a copolymer of ethylene and a vinyl ester of a $C_2$–$C_6$ aliphatic carboxylic acid, a $C_1$–$C_6$ alkyl acrylate or a $C_1$–$C_6$ alkyl methacrylate, and (b) a silane-treated hydrated inorganic filler, the concentration of said filler being 80 to 400 parts of filler per 100 parts of copolymer, (c) halogenated flame retardants, and antimony trioxide which comprises utilizing as an unusually effective flame retardant a dual lubricant system comprising a fatty acid of from 8 to 25 carbon atoms and an alkylene-bis-amide in which the alkylene group contains from 2 to 8 carbon atoms and the amide groups contain from 8 to 25 carbon atoms.

This invention also relates to an electrical conductor coated with a uniinsulating layer comprising these crosslinkable polymer compositions.

DETAILED DESCRIPTION OF THE INVENTION

The present invention relates to crosslinkable polymeric compositions comprising copolymers of ethylene and a vinyl ester of an aliphatic carboxylic acid, an alkyl acrylate or an alkyl methacrylate and a silane-treated hydrated inorganic filler which when used with a dual lubricant system as described above in combination with antimony trioxide and halogenated and non-halogenated flame retardants possesses very high flame-retardant characteristics. These compositions find particular utility as wire and cable insulation.

The compositions of this invention contain, in addition to a particular lubricant combination, one or more halogenated flame retardants and, optionally antimony trioxide, one or more crosslinkable or curable ethylene copolymers, one or more silanes and one or more hydrated inorganic fillers. The copolymers, silanes and inorganic fillers include those described in U.S. Pat. Nos. 3,832,326 and 3,922,422 of North et al., the disclosures of which are incorporated herein by reference.

THE CROSSLINKABLE COPOLYMER COMPONENTS

The terms crosslinkable or crosslinking are ascribed their normal art recognized meaning in the present specification, i.e., they denote the formation of primary valence bonds between polymer molecules.

Crosslinking can be accomplished by any of the known procedures such as chemical means including peroxide crosslinking; by radiation using cobalt-60, accelerators, α-rays, γ-rays, electrons, X-rays, etc.; or by thermal crosslinking. The basic procedures for crosslinking polymers are extremely well known to the art and need not be described here in detail.

The polymeric component of the present composition is a copolymer of ethylene and a comonomer which may be a vinyl ester, an acrylate or a methacrylate. The vinyl ester may be a vinyl ester of a $C_2$–$C_6$ aliphatic carboxylic acid, such as vinyl acetate, vinyl propionate, vinyl butyrate, vinyl pentanoate or vinyl hexanoate. The acrylates and methacrylates may be any of the $C_1$–$C_6$ alkyl esters including, for example, methyl, ethyl, propyl, butyl, pentyl or hexyl acrylate or methacrylate. The preferred copolymer comprising the polymeric component of this invention is an ethylene-vinyl acetate copolymer containing about 6 to about 90%, preferably about 9 to about 40%, most preferably about 9 to about 28%, vinyl acetate, balance ethylene.

Although little is gained, and some properties are even harmed, it is possible to include minor proportions of other crosslinkable polymers or copolymers in the composition of this invention. However, ethylene copolymers, preferably, ethylene-vinyl acetate copolymers, as described above, should comprise at least about 66% of the total polymers present. Representative of such minor polymeric components which can be used in such non-preferred embodiments include polyethylene, copolymers of ethylene with propylene, butene, the acrylates and maleates, polydimethyl siloxane and polymethylphenylsiloxane, copolymers of vinyl acetate with the acrylates, etc. Obviously, mixtures of these minor polymeric components can be used.

Terpolymers of ethylene and vinyl acetate derived from, e.g., any of the corresponding monomeric materials listed above (other than ethylene or vinyl acetate) can be used. A representative terpolymer would be an ethylene-vinyl acetate-vinyl maleate terpolymer.

The ethylene-vinyl acetate copolymers used in our invention preferably have a melt index of from about 1.0 to about 20.0.

The polyethylenes useful in the present invention include essentially all high, medium and low density polyethylenes as well as mixtures thereof. The most preferred polyethylenes for blending for use as uniinsulation for electrical wires and cables generally have a density of from about 0.900 to about 0.950 gm./cc. and a melt index of from about 1.0 to about 10.0.

Specifically, the compositions of the present invention provide a highly flame retardant composition surprisingly by use of a dual lubricant combination while retaining other desireable characteristics including an unexpected balance of:

1. low temperature brittleness, i.e., the composition will not readily crack during low temperature movement (ASTM D 746).
2. heat resistance after aging, i.e., excellent elongation after extended service at 90° C. and even 125° C.
3. arcing and tracking resistance, as high as 5 KV, whereas even porcelain shows surface breakdown at 4 KV. This property is not often required, however, in the preferred environment of under 600 volt service.
4. moisture resistance, i.e., low mechanical absorption of water which yields a superior dielectrical constant.
5. resistance to industrial chemicals.
6. resistance to oil and gasoline or diesel fuels.

It is not known why the compositions of this invention provide such a superior balance of properties. It is possible that there is some synergistic relationship between the ethylene-vinyl acetate copolymer, silane and hydrated inorganic filler, but there is no intention to be bound by such a theory. However, it has been established that for low voltage environments, less than 5000 volts, even more particularly for less than 600 volt environments, the compositions of this invention are particularly useful for service as uniinsulation. Uniinsulation is an art accepted term denoting insulation where one layer is extruded around the conductor, and this one layer serves as the electrical insulation and the jacketing to provide physical and flame protection. The present compositions are especially adapted for service as uniinsulation in the under 5000 volt range, and most especially in the under 600 volt range, where only a single extruded coating is used, and it is in this environment that a superior balance of properties is required. It has been further found that ethylene-vinyl acetate copolymers will hold very large amounts of filler and still provide high flexibility and a high degree of crosslinking. The simultaneous achievement of high filler loading, flexibility and crosslinking is quite surprising as high flexibility and high crosslinking were generally believed incompatible, as are high crosslinking and high filler loading (which implies low crosslinkable polymer content). Ethylene-vinyl acetate copolymers further provide superior fire retardancy to the polymeric compositions of the present invention.

The above described ethylene-vinyl acetate copolymers may be crosslinked by irradiation with high-energy electron beams or through the use of chemical crosslinking additives. Fully crosslinked, these polymers become thermoset in behavior. In the preferred compositions of this invention, chemical crosslinking is preferred, particularly where superior physical strength is required.

Chemical crosslinking is accomplished by incorporating a crosslinking agent, e.g., dicumyl peroxide or alpha, alpha' bis(t-butylperoxy) diisopropylbenzene, into the ethylene-vinyl acetate copolymer. The peroxide is later activated during processing to link the ethylene-vinyl acetate polymer chains into a three-dimensional network (and other minor amounts of crosslinkable polymer, if present).

The chemical crosslinking is carried out in accordance with procedures well known in the art, and variations in the general cross-linking conditions set out below will be apparent to one skilled in the art. The present invention is moreover, not limited to the use of tertiary organic peroxides for chemical crosslinking, and other art recognized materials which decompose to provide free radicals can be used. Obviously such crosslinking agents should not be decomposed during compounding of the composition, but the selection of acceptable cross-linking agents will be apparent to those skilled in the art.

Generally speaking, as the amount of cross-linking agent used increases, the degree of polymer crosslinking increases. Usually no more than 10% (based on polymer) of the organic tertiary peroxides need be used, with 3 to 6% being more typical values. Other crosslinking agents may require different amounts, but these can be readily determined. It is often advisable to avoid very low amounts of crosslinking agents, since some loss or resistance to deformation under sudden or continuous pressure may ensue. Cross-linking coagents such as triallylcyanurate and the like may also be included to increase the effectiveness of the crosslinking agent.

The tertiary organic peroxides, as with most other chemical crosslinking agents, are activated by heating to above their activation temperature whereupon decomposition thereof occurs. Any of the known procedures can be used to accomplish activation, e.g., high pressure steam application to the composition.

The art of radiation crosslinking is so highly developed that little need be said with respect to such procedures. As higher total doses of radiation are used, the degree of crosslinking generally increases, and for preferred crosslinkings a total radiation dose of about 5-25 megarads will be used.

Crosslinking is generally conducted at above atmospheric pressures, e.g., on the order of 200 to 400 psi, although higher or lower pressures may be used. Pressure is necessary when curing with steam to obtain the required temperature for activation of the peroxide catalyst. With high temperature gas curing, pressure is desired to avoid porosity in the insulation. Porosity is highly undesirable in electrical insulation since it lowers electrical insulation properties and can cause premature failure from corona.

In general, the higher the degree of crosslinking the more resistant the polymeric composition is to heat, moisture, chemical reagents, changes with aging and environmental conditions, etc., and usually abrasion. At lower degrees of crosslinking there is also some loss of heat resistance as well as pronounced effect on percent elongation after aging. The exact degree of crosslinking can, of course, be varied to take the above factors and their effect on the final product into account. Although higher or lower values can be used, for wire and cable insulation a crosslinking percentange on the order of about 85–95% for ethylenevinyl acetate is generally preferred, determined by extraction weight of soluble components in the cross-linked polymer.

THE SILANE COMPONENT

One or more substituted silanes comprise the second essential component of the polymeric compositions of the present invention.

Any silane may be used in the present invention while will not adversely affect the desired balance of properties and which will help to bind the polymer and inorganic filler of the present invention, provided that the silane does not make the composition combustible and does not interfere with polymer crosslinking or degrade during polymer processing, e.g., alkoxy and amine silanes.

The preferred silanes used in forming the insulating compositions are the alkoxysilanes, e.g., lower alkyl-, alkenyl-, alkynyl- and arylalkoxysilanes as well as the lower alkyl-, alkenyl-, alkynyl, and arylalkoxyalkoxy- or aryloxyalkylsilanes. Specific examples of such silanes are methyltriethoxy-, methyltris (2-methoxyethoxy)-, dimethyldiethoxy-, alkyl-trimethoxy-, vinyltris(2-methoxyethoxy)-, phenyl-tris(2-methoxyethoxy), vinyl-trimethoxy- and vinyltriethoxysilane.

It is preferred to use the vinylsilanes for best results, and of the vinylsilanes the following are especially preferred:

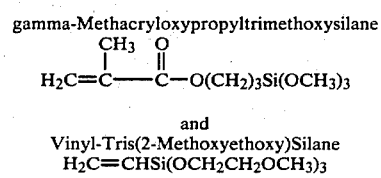

gamma-Methacryloxypropyltrimethoxysilane and
Vinyl-Tris(2-Methoxyethoxy)Silane
H$_2$C=CHSi(OCH$_2$CH$_2$OCH$_3$)$_3$

THE HYDRATED INORGANIC FILLER COMPONENT

The fillers used in the present invention are the hydrated inorganic fillers, e.g., hydrated aluminum oxides (Al$_2$O$_3$.3H$_2$O or Al(OH)$_3$), hydrated magnesia, hydrated calcium silicate. Of these compounds, the most preferred is hydrated aluminum oxide.

To obtain the superior balance of properties described, it is mandatory that a hydrated inorganic filler be used in formulating the polymeric compositions It must be emphasized that large proportions of another type of filler, be it inert or not, cannot be added to the compositions and still achieve the superior balance of properties.

The water of hydration in the inorganic filler must be released during the application of heat sufficient to cause combustion or ignition of the ethylene-vinyl acetate copolymer. The water of hydration chemically bound to the inorganic filler is released endothermically. It has been found that the hydrated inorganic filler increased flame retardance in a manner far superior to other fillers previously used by the art to provide insulation with flame retardance, e.g., carbon black, clays, titanium dioxide, etc. What is even more surprising is that flame retardance is combined with excellent electrical insulation properties at the high filler loadings used, since at these loadings the copolymeric composition contains a large amount of bound water.

The filler size should be in accordance with those sizes used by the prior art.

THE ANTIOXIDANT COMPONENT

An antioxidant composition which can also be included as a component of the polymeric compositions of the present invention includes a diester of thiodipropionic acid, the preferred diester being distearyl-3, 3' thiodipropionate (DSTDP). It has been found that the use of two different types of antioxidants provides effective oxidation inhibition. Thus, a mixture of an antioxidant of the chain breaking type and one which is a peroxide decomposer provides a very effective antioxidant composition. Therefore, with DSTDP, which is a known peroxide decomposer, an amine or a hindered phenol may be effectively employed as an antioxidant composition. Among these free radical scavengers, the stearically hindered phenols are especially effective. Useful phenols include the alkylated phenols, the alkylidene-bis-alkylated phenols and the polyphenols. Specific examples thereof include 2,6 ditertiary butyl-para-cresol, octadecyl 3,5-di-t-butyl-4-hydroxyhydrocinnamate, 2,2'-methylene bis(6-t-butyl-4-methyl phenol), 4,4'-butylidene bis (6-t-butyl-3 methyl phenol), 1,3,5-trimethyl-2,4,6-tris (3,5-di-t-butyl-4-hydroxybenzyl) benzene and tetrakis (methylene (3,5-di-t-butyl-4-hydroxy-hydrocinnamate) methane with the latter being particularly preferred.

THE LUBRICANT COMPONENT

When polymeric insulation is formed on conductors by extrusion, it is preferred that a lubricant form a portion of the insulating composition. Such lubricants as a fatty acid soap or a metallic derivative thereof have been used heretofore. The lubricant not only aids in the extrusion process but it also improves the stripping properties of wire insulation thereby facilitating the task of the end-user.

The lubricant component comprises an essential component of the polymeric compositions of this invention. It has been found that the combination of antimony trioxide and halogenated flame retardant in addition to the hydrated filler in the required concentration, plus a particular two component lubricant composition provided in a lubricating effective amount, unexpectedly provides the crosslinked compositions of the present invention with exceptionally good flame-retardant properties.

Calcium stearate has often been employed heretofore as a lubricant for polymeric compositions such as those of North et al. Now, however, it has been found that a lubricant composition comprising a fatty acid such as lauric acid and a alkylene-bis-amide such as ethylene-bis-stearamide, especially when used in combination with antimony trioxide and halogenated and non-halogenated flame retardants, will produce a cross-linked composition with significantly enhanced flame retardant properties.

The dual lubricant composition of the present invention comprises a fatty acid of from 8 to 25 carbon and an alkylene-bis-amide having the general formula:

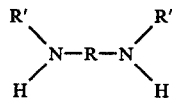

wherein
R = a divalent alkylene radical of from 2 to 8 carbon atoms; and
R' =

wherein $R^2$ is an aliphatic radical having from 8 to 25 carbon atoms,
in a proportion of from about 1:1 to about 1:6 of fatty acid to alkylene-bis-amide, and preferably in a proportion of about 1:3 acid to alkylene-bis-amide. Preferably the dual lubricant composition comprises 25 percent lauric acid and 75 percent ethylene-bis-stearamide. The total amount of dual lubricant composition should be from about 0.01 to about 10 percent by weight of the total polymeric composition, and preferably from about 0.5 to about 3 percent.

OTHER FLAME RETARDANT COMPONENTS

It has been found that the dual component lubricant composition is especially effective in a peroxide curable polymeric composition when used in combination with antimony trioxide, and halogenated flame retardants such as ethylene-bis-tetra-bromophthalimide, decabromodiphenyl oxide, etc. The antimony trioxide is included in an amount of from about 2 to about 20 percent by weight and preferably from about 4 to about 8 percent by weight, and the halogenated flame retardant is included in an amount of from about 5 to about 30 percent by weight, and preferably from about 8 to about 14 percent by weight of the total polymeric composition.

THE PROPORTION OF THE OTHER COMPONENTS

The amounts of polymer and filler in the composition of this invention can be varied within the wide proportions. The silane percentage should be in the range of from about 0.5 to 5.0 parts per 100 parts of polymer. Lower amounts may be insufficient to provide adequate surface treatment while larger quantities could have an adverse effect on some of the physical properties, i.e., elongation, of an extruded insulating compound after crosslinking.

Best results are obtained in coating, e.g., extruding, onto electrical wires and cables when from 80 to 400 or more weight parts of filler (most preferable at least 125–150 weight parts), 0.5 to 5.0 weight parts of silane and 100 weight parts of polymer are present.

The composition of the present invention may be formed in a number of ways. However, in every instance it is necessary that the filler and polymer be in intimate contact with the silane when dispersion of the filler in the polymer is initiated. This can be done in an internal mixer, such as a Banbury or Werner & Pfleiderer extruder.

Any processing device known to the art which insures an intimate mixture of the essential components may be used, provided the silane couples the hydrated inorganic filler to the polymeric component.

It will be apparent that in addition to the essential components of the compositions of this invention, other additives may be present, e.g., pigments, stabilizers, so long as they do not interfere with crosslinking, when desired, or harm desired properties. Such materials are present in very minor proportions, ranging from less than 10% of the polymer, and usually in amounts of less than 5%. There are two reasons amounts of other components are not desirable; firstly, the present composition per se has such superior properties; secondly, any significant amounts of other fillers for example, serve only to degrade or upset the balance or properties.

For the formation of insulation on conductors by extrusion, a lubricant such as a fatty acid soap or metallic derivative thereof has in the past been utilized with success. Such materials have also improved the stripping properties of wire insulation and thereby permit the insulation to be easily stripped from the wire by the user to facilitate splicing and to make terminations. It has been the practice to use acceptable soaps such as the alkaline earth metal fatty acid soaps, a preferred soap being calcium stearate. Additional representative examples of such lubricants include the alkaline earth metal salts and aluminum salts of stearic acid, oleic acid, palmitic acid and other fatty acids used by the art for this purpose, silicone oil, long chain aliphatic amides, waxes, etc. Now, however, it has been discovered that the dual lubricant system of the present invention serves not only as an effective lubricant but also enhances flame retardant properties, especially when used with a halogenated flame retardant, antimony trioxide, and a nonhalogenated flame retardant in a peroxide curable polymeric composition.

The following examples are provided to further illustrate certain aspects of the invention.

A number of crosslinkable polymeric compositions shown in Table 1 below are prepared in which the lubricant used was calcium stearate. (The numbers in the tables indicate parts by weight).

Each of these compositions were extruded onto 14 AWG wire and subjected to Underwriters Laboratories Flame Retardant VW-1 (Vertical-Wire) test (UL FR-1).

The results of the UL FR-1 tests conducted on the samples which included calcium stearate are shown on Table II.

TABLE I

| Sample No. | 1 | 2 | 3 | 4 | 5 | 6 | 7 | 8 | 9 | 10 |
|---|---|---|---|---|---|---|---|---|---|---|
| UE630 | 100 | 100 | 100 | 100 | 80 | 95 | 80 | 95 | 100 | 100 |
| Ey904 | 0 | 0 | 0 | 0 | 20 | 5 | 20 | 5 | 0 | 0 |
| Hydrated Alumina | 100 | 100 | 100 | 100 | 100 | 100 | 100 | 100 | 125 | 125 |
| Silane A-172 | 2 | 2 | 2 | 2 | 2 | 2 | 2 | 2 | 2 | 2 |
| Aegerite MA Antioxidant | 2 | 2 | 2 | 2 | 2 | 2 | 2 | 2 | 2 | 2 |
| Saytex BT93 | 30 | 30 | 0 | 0 | 30 | 30 | 30 | 30 | 30 | 20 |

TABLE I-continued

| | | | | | | | | | | |
|---|---|---|---|---|---|---|---|---|---|---|
| Brominated Flame-Retardant FR300BA Deca Bromodiphenyl Oxide Flame-Retardant | 0 | 0 | 30 | 30 | 0 | 0 | 0 | 0 | 0 | 0 |
| Thermogard CPA | 15 | 6 | 15 | 6 | 15 | 15 | 6 | 6 | 15 | 10 |
| Calcium Stearate | 2 | 2 | 2 | 2 | 2 | 2 | 2 | 2 | 2 | 2 |
| Lauric Acid | 0 | 0 | 0 | 0 | 0 | 0 | 0 | 0 | 0 | 0 |
| Ethylene-bis-Stearamide | 0 | 0 | 0 | 0 | 0 | 0 | 0 | 0 | 0 | 0 |
| Vulcup 40KE (Peroxide) | 4.25 | 4.25 | 4.25 | 4.25 | 4.25 | 4.25 | 4.25 | 4.25 | 4.25 | 4.25 |
| $Sb_2O_3$ | 0 | 0 | 0 | 0 | 0 | 0 | 0 | 0 | 0 | 0 |

| Sample No. | 11 | 12 | 13 | 14 | 15 | 16 | 17 | 18 | 19 |
|---|---|---|---|---|---|---|---|---|---|
| UE630 | 100 | 100 | 100 | 100 | 100 | 100 | 100 | 100 | 100 |
| Ey904 | 0 | 0 | 0 | 0 | 0 | 0 | 0 | 0 | 0 |
| Hydrated Alumina | 125 | 100 | 0 | 0 | 0 | 100 | 100 | 100 | 100 |
| Silane A-172 | 2 | 2 | 2 | 2 | 2 | 2 | 2 | 2 | 2 |
| Aegerite MA Antioxidant | 2 | 2 | 2 | 2 | 2 | 2 | 2 | 2 | 2 |
| Saytex BT93 Brominated Flame-Retardant | 20 | 20 | 30 | 0 | 30 | 15 | 15 | 30 | 30 |
| FR300BA Deca Bromodiphenyl Oxide Flame-Retardant | 0 | 0 | 0 | 30 | 0 | 0 | 0 | 0 | 0 |
| Thermogard CPA | 6 | 15 | 15 | 15 | 6 | 5 | 15 | 15 | 15 |
| Calcium Stearate | 2 | 2 | 2 | 2 | 2 | 2 | 2 | 2 | 2 |
| Lauric Acid | 0 | 0 | 0 | 0 | 0 | 0 | 0 | 0 | 0 |
| Ethylene-bis-Stearamide | 0 | 0 | 0 | 0 | 0 | 0 | 0 | 0 | 0 |
| Vulcup 40KE (Peroxide) | 4.25 | 4.25 | 4.25 | 4.25 | 4.25 | 4.25 | 4.25 | 4.25 | 4.25 |
| $Sb_2O_3$ | 0 | 0 | 0 | 0 | 0 | 0 | 0 | 0 | 0 |

TABLE II

| Test Sample | Ave Thickness in μ | 1st Burn | 2nd Burn | 3rd Burn | 4th Burn | 5th Burn | Glowing Particles | Flag Burn | Cotton Burn | Pass/Fail |
|---|---|---|---|---|---|---|---|---|---|---|
| 1 | 98 | 0 | 5 | 0 | 0 | 0 | Yes | No | Yes | Fail |
| | | 0 | 0 | 28 | 0 | 0 | Yes | No | Yes | |
| | | 0 | 23 | 0 | 0 | 0 | No | No | No | |
| 2 | 103 | 0 | 30 | 0 | 0 | 0 | No | No | No | Fail |
| | | 0 | 0 | 2 | 0 | 0 | Yes | No | Yes | |
| | | 2 | 2 | 7 | 0 | 0 | Yes | No | Yes | |
| 3 | 97 | 15 | 0 | 0 | 0 | 0 | Yes | No | Yes | Fail |
| | | 15 | 3 | 0 | 0 | 0 | Yes | No | Yes | |
| | | 0 | 0 | 0 | 0 | 0 | Yes | No | Yes | |
| 4 | 98 | 7 | 0 | 20 | 0 | 0 | Yes | No | Yes | Fail |
| | | 20 | 0 | 0 | 0 | 0 | Yes | No | Yes | |
| | | 33 | 5 | 0 | 0 | 0 | No | No | No | |
| 5 | 103 | 0 | 9 | 3 | 0 | 0 | No | No | No | Pass |
| | | 0 | 16 | 0 | 0 | 0 | No | No | No | |
| | | 0 | 4 | 3 | 0 | 0 | No | No | No | |
| 6 | 102 | 0 | 6 | 0 | 0 | 0 | No | No | No | Fail |
| | | 0 | 0 | 3 | 0 | 0 | Yes | No | Yes | |
| | | 0 | 21 | 0 | 0 | 0 | No | No | No | |
| 7 | 103 | 0 | 0 | 4 | 0 | 0 | Yes | No | Yes | Fail |
| | | 0 | 10 | 0 | 0 | 0 | No | No | No | |
| | | 0 | 0 | 4 | 0 | 0 | Yes | No | Yes | |
| 8 | 108 | 2 | 0 | 6 | 0 | 0 | Yes | No | Yes | Fail |
| | | 0 | 0 | 20 | 0 | 0 | Yes | No | Yes | |
| | | 0 | 7 | 8 | 0 | 0 | Yes | No | Yes | |
| 9 | 95 | 0 | 2 | 0 | 0 | 0 | No | No | No | Fail |
| | | 0 | 15 | 6 | 0 | 0 | Yes | No | Yes | |
| | | 0 | 6 | 3 | 0 | 0 | No | No | No | |
| 10 | 98 | 7 | 5 | 0 | 0 | 0 | Yes | No | Yes | Fail |
| | | 10 | 4 | 5 | 0 | 0 | Yes | No | Yes | |
| | | 0 | 3 | 0 | 0 | 0 | Yes | No | Yes | |
| 11 | 99 | 0 | 4 | 2 | 0 | 0 | Yes | No | Yes | Fail |
| | | 65 | 0 | 0 | 0 | 0 | No | No | No | |
| | | 62 | 0 | 0 | 0 | 0 | No | No | No | |
| 12 | 99 | 0 | 0 | 4 | 0 | 0 | Yes | No | Yes | Fail |
| | | 0 | 0 | 0 | 0 | 0 | Yes | No | Yes | |
| | | 0 | 0 | 95 | 0 | 0 | Yes | Yes | Yes | |
| 13 | 98 | 5 | 5 | 0 | 0 | 0 | Yes | No | Yes | Fail |

TABLE II-continued

| Test Sample | Ave Thickness in μ | Seconds Sample Remains in Flame | | | | | Glowing Particles | Flag Burn | Cotton Burn | Pass/ Fail |
|---|---|---|---|---|---|---|---|---|---|---|
| | | 1st Burn | 2nd Burn | 3rd Burn | 4th Burn | 5th Burn | | | | |
| | | 10 | 0 | 0 | 0 | 0 | Yes | No | Yes | |
| | | 0 | 0 | 104 | 0 | 0 | Yes | Yes | Yes | |
| 14 | 96 | 22 | 15 | 5 | 0 | 0 | No | No | No | Fail |
| | | 0 | 88 | 0 | 0 | 0 | Yes | Yes | Yes | |
| | | 0 | 0 | 0 | 0 | 0 | Yes | No | Yes | |
| 15 | 95 | 62 | 0 | 0 | 0 | 0 | No | No | No | Fail |
| | | 0 | 23 | 0 | 0 | 0 | No | No | No | |
| | | 34 | 4 | 0 | 0 | 0 | Yes | No | Yes | |
| 16 | 100 | 10 | 10 | 7 | 0 | 0 | Yes | No | Yes | Fail |
| | | 10 | 10 | 3 | 0 | 0 | Yes | No | Yes | |
| | | 15 | 16 | 0 | 0 | 0 | Yes | No | Yes | |
| 17 | 97 | 110 | 0 | 0 | 0 | 0 | No | Yes | No | Fail |
| | | 0 | 10 | 9 | 0 | 0 | Yes | No | Yes | |
| | | 10 | 6 | 5 | 0 | 0 | Yes | No | Yes | |
| 18 | 100 | 0 | 35 | 0 | 0 | 0 | No | No | No | Fail |
| | | 0 | 35 | 0 | 0 | 0 | No | No | No | |
| | | 0 | 45 | 0 | 0 | 0 | Yes | No | Yes | |
| 19 | 101 | 0 | 35 | 0 | 0 | 0 | No | No | No | Pass |
| | | 0 | 8 | 0 | 0 | 0 | No | No | No | |
| | | 0 | 13 | 0 | 0 | 0 | No | No | No | |

The "Yes" in the last three columns indicates that the insulation material did produce the result described, e.g., yes indicates that glowing particles were produced, that the cotton base was burned, and that the insulation did burn up the wire to the "flag".

As can be seen from the results of the tests, only two samples, Nos. 5 and 19, containing calcium stearate passed the UL FR-1 flame retardancy test. This performance is not considered satisfactory. Although the two materials passed the test, their similarity in formulation to other materials indicates reproducible passage of the FR-1 Test would be very poor and not acceptable for commercial utilization.

Further samples were prepared utilizing a dual component lubricant in combination with the halogenated flame-retardant and antimony trioxide as shown in Table III.

TABLE III

| Sample No. | 20 | 21 | 22 | 23 | 24 | 25 | 26 | 27 | 28 | 29 | 30 |
|---|---|---|---|---|---|---|---|---|---|---|---|
| UE630/631 | 100 | 95 | 100 | 100 | 100 | 100 | 100 | 80 | 80 | 100 | 100 |
| Ey904 | 0 | 5 | 0 | 0 | 0 | 0 | 0 | 20 | 20 | 0 | 0 |
| Hydrated Alumina | 100 | 100 | 100 | 100 | 100 | 100 | 100 | 100 | 100 | 100 | 100 |
| Silane A-172 | 2 | 2 | 2 | 2 | 2 | 2 | 2 | 2 | 2 | 2 | 2 |
| Aegerite MA Antioxidant | 2 | 2 | 2 | 2 | 2 | 2 | 2 | 2 | 2 | 2 | 2 |
| Saytex BT93 | 30 | 30 | 30 | 0 | 30 | 30 | 0 | 30 | 0 | 30 | 25 |
| FR300BA | 0 | 0 | 0 | 30 | 0 | 0 | 30 | 0 | 30 | 0 | 0 |
| Thermogard CPA | 15 | 15 | 15 | 15 | 15 | 0 | 0 | 15 | 15 | 10 | 12.5 |
| Ca Stearate | 0 | 0 | 0 | 0 | 0 | 0 | 0 | 0 | 0 | 0 | 0 |
| Lauric Acid | 0.125 | 0.125 | 0.125 | 0.125 | 0.25 | 0.25 | 0.25 | 0.25 | 0.25 | 0.25 | 0.25 |
| Ethylene-bis-Stearamide | 0.375 | 0.375 | 0.375 | 0.375 | 0.75 | 0.75 | 0.75 | 0.75 | 0.75 | 0.75 | 0.75 |
| Vulcup 90KE | 4.25 | 4.25 | 4.25 | 4.25 | 4.25 | 4.25 | 4.25 | 4.25 | 4.25 | 4.25 | 4.25 |
| $Sb_2O_3$ | 0 | 0 | 0 | 0 | 0 | 15 | 15 | 0 | 0 | 0 | 0 |

The UL FR-1 test was conducted on the samples which contained the dual lubricant system, the results of which are shown in Table IV.

TABLE IV

| Test Sample | Ave Thickness in μ | Seconds Sample Remains in Flame | | | | | Glowing Particles | Flag Burn | Cotton Burn | Pass/ Fail |
|---|---|---|---|---|---|---|---|---|---|---|
| | | 1st Burn | 2nd Burn | 3rd Burn | 4th Burn | 5th Burn | | | | |
| 20 | 103 | 0 | 9 | 3 | 0 | 0 | No | No | No | Pass |
| | | 0 | 16 | 0 | 0 | 0 | No | No | No | |
| | | 0 | 4 | 3 | 0 | 0 | No | No | No | |
| 21 | 99 | 0 | 0 | 6 | 0 | 0 | No | No | No | Fail |
| | | 0 | 3 | 0 | 0 | 0 | Yes | No | Yes | |
| | | 0 | 0 | 30 | 0 | 0 | No | No | No | |
| 22 | 95 | 0 | 6 | 0 | 0 | 0 | No | No | No | Pass |
| | | 0 | 23 | 0 | 0 | 0 | No | No | No | |
| | | 0 | 15 | 0 | 0 | 0 | No | No | No | |
| 23 | 94 | 0 | 3 | 0 | 0 | 0 | Yes | No | Yes | Fail |
| | | 0 | 33 | 0 | 0 | 0 | Yes | No | Yes | |
| | | 0 | 38 | 0 | 0 | 0 | Yes | No | Yes | |
| 24 | 97 | 0 | 3 | 0 | 0 | 0 | No | No | No | Pass |
| | | 0 | 2 | 16 | 0 | 0 | No | No | No | |
| | | 0 | 3 | 0 | 0 | 0 | No | No | No | |
| 25 | 105 | 0 | 25 | 0 | 0 | 0 | No | No | No | Pass |

TABLE IV-continued

| Test Sample | Ave Thickness in μ | Seconds Sample Remains in Flame | | | | | Glowing Particles | Flag Burn | Cotton Burn | Pass/ Fail |
|---|---|---|---|---|---|---|---|---|---|---|
| | | 1st Burn | 2nd Burn | 3rd Burn | 4th Burn | 5th Burn | | | | |
| | | 0 | 19 | 0 | 0 | 0 | No | No | No | |
| | | 0 | 6 | 0 | 0 | 0 | No | No | No | |
| 26 | 97 | 0 | 18 | 0 | 0 | 0 | Yes | No | Yes | Fail |
| | | 0 | 31 | 0 | 0 | 0 | Yes | No | Yes | |
| | | 0 | 6 | 0 | 0 | 0 | Yes | No | Yes | |
| 27 | 90 | 0 | 0 | 0 | 0 | 0 | No | No | No | Pass |
| | | 0 | 22 | 0 | 0 | 0 | No | No | No | |
| | | 0 | 16 | 0 | 0 | 0 | No | No | No | |
| 28 | 97 | 0 | 5 | 0 | 0 | 0 | No | No | No | Pass |
| | | 0 | 26 | 0 | 0 | 0 | No | No | No | |
| | | 0 | 15 | 0 | 0 | 0 | No | No | No | |
| 29 | 100 | 0 | 12 | 0 | 0 | 0 | Yes | No | Yes | Fail |
| | | 0 | 34 | 0 | 0 | 0 | Yes | No | Yes | |
| | | 0 | 38 | 0 | 0 | 0 | Yes | No | Yes | |
| 30 | 98 | 0 | 12 | 0 | 0 | 0 | Yes | No | Yes | Fail |
| | | 0 | 50 | 0 | 0 | 0 | Yes | No | Yes | |
| | | 0 | 40 | 0 | 0 | 0 | Yes | No | Yes | |

It can be seen from these results that even under the stringent FR-1 test, the samples having compositions which include the dual lubricant system pass over 50% of the time whereas the samples without the dual lubricant system passed only 18% of the time.

Moreover, samples 22-30 which include the dual lubricant composition, when compared to sample 18 and 19 of which contain calcium stearate as a lubricant, can be seen to retain other desirable characteristics such as physical strength and elongation capabilities as shown in Table V.

TABLE V

| Sample No. | 18 | 19 | 22 | 23 | 24 | 25 | 26 | 27 | 28 | 29 | 30 |
|---|---|---|---|---|---|---|---|---|---|---|---|
| Tensile Strength, psi | 1880 | 1850 | 2110 | 2470 | 2180 | 2120 | 2250 | 1920 | 2070 | 2130 | 2230 |
| Elongation, % | 210 | 240 | 200 | 230 | 200 | 200 | 230 | 260 | 260 | 200 | 210 |
| After 7 Days @ 158° C. | | | | | | | | | | | |
| Tensile Strength, psi | 2060 | 1980 | 2150 | 2500 | 2280 | 2120 | 2230 | 2040 | 2150 | 2040 | 2260 |
| Elongation, % | 150 | 160 | 160 | 170 | 150 | 140 | 160 | 190 | 190 | 120 | 150 |

While there have been described what are presently believed to be the preferred embodiments of the invention, those skilled in the art will realize that changes and modifications may be made thereto without departing from the spirit of the invention, and it is intended to claim all such changes and modifications as fall within the true scope of the invention.

What is claimed is:

1. A crosslinkable polymeric composition having improved flame retardancy comprising:
   (a) a copolymer of ethylene and a vinyl ester of a $C_2$-$C_6$ aliphatic carboxylic acid, a $C_1$-$C_6$ alkyl acrylate or $C_1$-$C_6$ alkyl methacrylate,
   (b) from 80 to 400 parts of hydrated inorganic filler per 100 parts of copolymer,
   (c) 0.4 to 8 parts of an alkoxysilane per 100 parts of hydrated inorganic filler, and
   (d) a flame-retardant component containing a dual lubricant system comprising a fatty acid having from 8 to 25 carbon atoms and an alkylene-bisamide having the general formula:

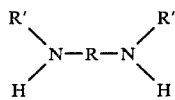

wherein
R = a divalent alkylene radical of from 2 to 8 carbon atoms; and
R′ =

wherein $R^2$ is an aliphatic radical having from 8 to 25 carbon atoms, a halogenated flame retardant and, optionally, antimony trioxide.

2. In a crosslinked polymeric composition having significant flame retardancy which comprises:
   (a) a copolymer of ethylene and a vinyl ester of a $C_2$-$C_6$ aliphatic carboxylic acid, a $C_1$-$C_6$ alkyl acrylate or $C_1$-$C_6$ alkyl methacrylate,
   (b) from about 80 to about 400 parts of hydrated inorganic filler per 100 parts of copolymer, and
   (c) about 0.4 to about 8 parts of an alkoxysilane per 100 parts of hydrated inorganic filler; the improvement comprising:
   (d) a flame-retardant component containing a dual lubricant system comprising a fatty acid having from 8 to 25 carbon atoms and an alkylene-bisamide having the general formula

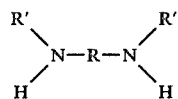

wherein
R = a divalent alkylene radical of from 2 to 8 carbon atoms;
R′ =

$$\begin{matrix} O \\ \| \\ -C-R^2, \end{matrix}$$

wherein $R^2$ is an aliphatic radical having from 8 to 25 carbon atoms, a halogenated flame-retardant, and, optionally, antimony trioxide.

3. The composition of claim 1, wherein said dual lubricant system is present in an amount of from about 0.1 to about 10 percent by weight of the total polymeric composition.

4. The composition of claim 3, wherein said dual lubricant system is present in an amount of from about 0.5 to about 3.0 percent by weight of the total polymeric composition.

5. The composition of claim 3, wherein the ratio of said fatty acid to said alkylene-bis-amide is from about 1:1 to about 1:6.

6. The composition of claim 5, wherein said ratio is about 1:3.

7. The composition of claim 3, wherein said fatty acid is lauric acid.

8. The composition of claim 3, wherein said alkylene-bis-amide is ethylene-bis-stearamide.

9. The composition of claim 3, wherein said dual lubricant system comprises lauric acid and ethylene-bis-stearamide.

10. The composition of claim 9, wherein the ratio of said lauric acid to said ethylene-bis-stearamide is about 1:3.

11. The composition of claims 1, wherein said halogenated flame retardant is present in an amount of from about 5 to about 30 percent by weight of the total polymeric composition.

12. The composition of claim 5, wherein said halogenated flame retardant is present in an amount of from about 8 to about 14 percent by weight of the total polymeric composition.

13. The composition of claims 1, wherein said halogenated flame retardant is selected from the group consisting of ethylene-bis-tetra-bromophthalimide and decabromodiphenyl oxide.

14. The composition of claims 1, wherein said antimony trioxide is present in an amount of from about 2 to about 20 percent by weight of the total polymeric composition.

15. The composition of claim 14, wherein said antimony trioxide is present in an amount of from about 4 to about 8 percent by weight of the total polymeric composition.

16. An electrical conductor coated with a uniinsulating layer comprising the crosslinked polymeric compositions of claim 1.

17. A method of providing flame retardancy to a crosslinkable polymeric composition comprising:
(a) a copolymer of ethylene and a vinyl ester of a $C_2$–$C_6$ aliphatic carboxylic acid, a $C_1$–$C_6$ alkyl acrylate or $C_1$–$C_6$ alkyl methacrylate,
(b) from 80 to 400 parts of hydrated inorganic filler per 100 parts of copolymer, and
(c) 0.4 to 8 parts of an alkoxysilane per 100 parts of hydrated inorganic filler, by including in said composition a flame-retardant component comprising a dual lubricant system comprising a fatty acid having from 8 to 25 carbon atoms and an alkylene-bis-amide having the general formula:

$$\begin{matrix} R' & & R' \\ \diagdown & & \diagup \\ & N-R-N & \\ \diagup & & \diagdown \\ H & & H \end{matrix}$$

wherein
R = a divalent alkylene radical of from 2 to 8 carbon atoms; and
R' =

$$\begin{matrix} O \\ \| \\ -C-R^2, \end{matrix}$$

wherein $R^2$ is an aliphatic radical having from 8 to 25 carbon atoms, a halogenated flame retardant and, optionally, antimony trioxide.

18. The method of claim 17, wherein said dual lubricant system is present in an amount of from about 0.1 to about 10 percent by weight of the total polymeric composition.

19. The method of claim 18, wherein said dual lubricant system is present in an amount of from about 0.5 to about 3.0 percent by weight of the total polymeric composition.

20. The method of claim 18, wherein the ratio of said fatty acid to said alkylene-bis-amide is from about 1:1 to about 1:6.

21. The method of claim 20, wherein said ratio is about 1:3.

22. The method of claim 17, wherein said fatty acid is lauric acid.

23. The method of claim 17, wherein said alkylene-bis-amide is ethylene-bis-stearamide.

24. The method of claim 17, wherein said dual lubricant system comprises lauric acid and ethylene-bis-stearamide.

25. The composition of claim 24, wherein the ratio of said lauric acid to said ethylene-bis-stearamide is about 1:3.

26. The method of claim 17, wherein said halogenated flame retardant is present in an amount of from about 5 to about 30 percent by weight of the total polymeric composition.

27. The method of claim 20, wherein said halogenated flame retardant is present in an amount of from about 8 to about 14 percent by weight of the total polymeric composition.

28. The method of claim 17, wherein said halogenated flame retardant is selected from the group consisting of ethylene-bis-tetrabromophthalimide and decabromodiphenyl oxide.

29. The method of claim 17, wherein said antimony trioxide is present in an amount of from about 2 to about 20 percent by weight of the total polymeric composition.

30. The method of claim 29, wherein said antimony trioxide is present in an amount of from about 4 to about 8 percent by weight of the total polymeric composition.

* * * * *